(12) United States Patent
Ryu (10) Patent No.: US 9,772,660 B2
(45) Date of Patent: Sep. 26, 2017

(54) TABLET CAPABLE OF SENSING LOCATION USING ELECTROMAGNETIC INDUCTION AND ELECTROSTATIC CAPACITANCE

(71) Applicant: THE HAN INC., Seoul (KR)

(72) Inventor: Young Kee Ryu, Seoul (KR)

(73) Assignee: THE HAN INC. (KR)

( * ) Notice: Subject to any disclaimer, the term of this patent is extended or adjusted under 35 U.S.C. 154(b) by 0 days.

(21) Appl. No.: 14/902,590

(22) PCT Filed: Jul. 2, 2014

(86) PCT No.: PCT/KR2014/005915
§ 371 (c)(1),
(2) Date: Jan. 3, 2016

(87) PCT Pub. No.: WO2015/002464
PCT Pub. Date: Jan. 8, 2015

(65) Prior Publication Data
US 2016/0179134 A1    Jun. 23, 2016

(30) Foreign Application Priority Data

Jul. 3, 2013 (KR) .................. 10-2013-0077691

(51) Int. Cl.
*G06F 1/16* (2006.01)
*G06F 3/046* (2006.01)
(Continued)

(52) U.S. Cl.
CPC .............. *G06F 1/169* (2013.01); *G06F 3/038* (2013.01); *G06F 3/03545* (2013.01);
(Continued)

(58) Field of Classification Search
CPC . G06F 3/044; G06F 3/046; G06F 2203/04106
See application file for complete search history.

(56) References Cited

U.S. PATENT DOCUMENTS

| 6,476,799 B1 | 11/2002 | Lee et al. |
| 2007/0018076 A1* | 1/2007 | Chen ........................ G06F 3/046 250/208.2 |

(Continued)

FOREIGN PATENT DOCUMENTS

| CN | 102426503 A | 4/2012 |
| CN | 102426503 B * | 5/2014 |

(Continued)

*Primary Examiner* — Benjamin C Lee
*Assistant Examiner* — Xuemei Zheng
(74) *Attorney, Agent, or Firm* — Renaissance IP Law Group LLP (57) ABSTRACT

The present invention relates to a tablet capable of sensing a location using electromagnetic induction and electrostatic capacitance. The tablet comprises: a loop antenna, having a closed-loop shape for surrounding a sensing area, capable of sensing an electromagnetic wave emitted from an electronic pen; a first line antenna provided with a plurality of first conductive patterns, both ends of each of the plurality of first conductive patterns being located on one side of the first line antenna; a second line antenna provided with a plurality of second conductive patterns which cross the plurality of first conductive patterns in the sensing area, both ends of each of the plurality of second conductive patterns being located on the side on which the both ends of each of the plurality of first conductive patterns are located; and a control circuit for sensing a location using electromagnetic induction and electrostatic capacitance by controlling a connection relation between the plurality of first conductive patterns and the plurality of second conductive patterns. Accordingly, it is possible to selectively recognize the manipulation of the electronic pen and the touch of a finger with the same antenna pattern.

9 Claims, 11 Drawing Sheets

(51) Int. Cl.

|  |  |
|---|---|
| *G06F 3/044* | (2006.01) |
| *G06F 3/041* | (2006.01) |
| *G06F 3/0354* | (2013.01) |
| *G06F 3/038* | (2013.01) |

(52) U.S. Cl.
CPC ............. *G06F 3/044* (2013.01); *G06F 3/046* (2013.01); *G06F 3/0416* (2013.01); *G06F 2203/04106* (2013.01)

(56) References Cited

U.S. PATENT DOCUMENTS

| | | |
|---|---|---|
| 2010/0238121 A1 | 9/2010 | Ely |
| 2011/0227588 A1 | 9/2011 | Chen et al. |
| 2014/0210711 A1* | 7/2014 | Liu ...................... G06F 3/0383 345/157 |

FOREIGN PATENT DOCUMENTS

| | | | |
|---|---|---|---|
| EP | 2267587 A2 | | 12/2010 |
| JP | 2008192117 A | | 8/2008 |
| JP | 2013058198 A | | 3/2013 |
| KR | 100910348 B1 | | 8/2009 |
| KR | 20100054274 A | | 5/2010 |
| KR | 20110057385 A | * | 6/2011 |
| KR | 101136550 B1 | | 4/2012 |
| KR | 101209514 B1 | | 12/2012 |
| KR | 101355939 B1 | | 1/2014 |

\* cited by examiner

TABLET CAPABLE OF SENSING LOCATION USING ELECTROMAGNETIC INDUCTION AND ELECTROSTATIC CAPACITANCE

TECHNICAL FIELD

The present invention relates to a tablet capable of sensing a location using electromagnetic induction and electrostatic capacitance, and more particularly, to a tablet capable of simultaneously sensing a change in the electromagnetic waves emitted from an electronic pen and a change in the electrostatic capacitance by a human finger by using the same antenna patterns without having a separate antenna pattern.

BACKGROUND ART

Korean Patent No. 10-910348 (Patent Document 1), for example, discloses a tablet including a resonance circuit and sensing a location of an electronic pen emitting an electromagnetic wave of a certain frequency.

Figure 1:
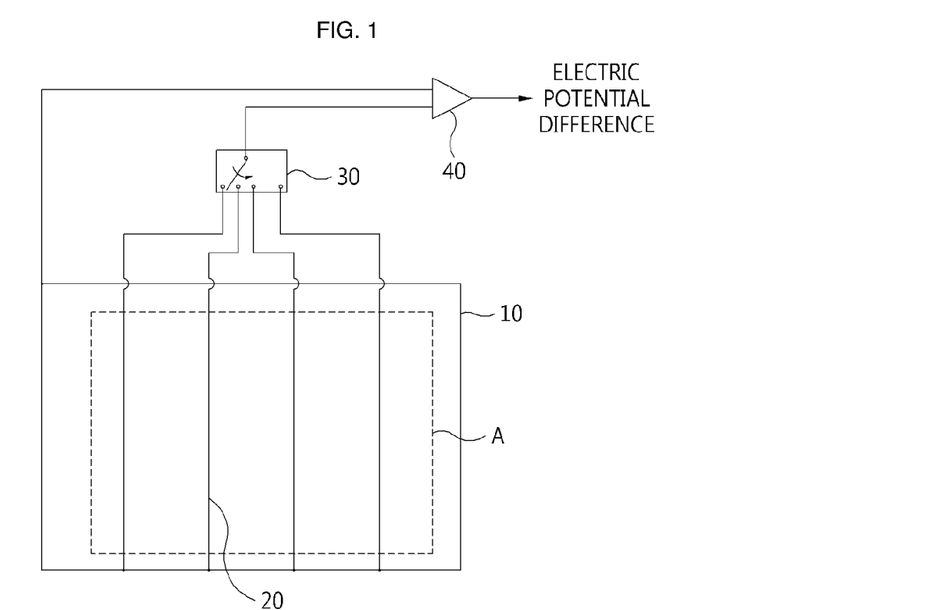
FIG. 1 illustrates an electric pen sensing circuit according to a related art.

FIG. 1 illustrates a summary of technology disclosed in Patent Document 1. Referring to FIG. 1, a tablet may include a loop antenna 10 forming a closed loop, a plurality of line antennas 20, each having one end electrically connected to the loop antenna 10, having a comb shape and parallelly arranged across the loop antenna 10, a multiplexer 30, in which the other ends of the line antennas 20 that are not connected to the loop antenna 10 are connected to a plurality of input sides and any one of the input sides is selected as an output side, and a differential amplifier 40 having one input connected to the loop antenna 10 and the other one input is connected to the output side of the multiplexer 30, to thus output a difference between an electric potential of the loop antenna 10 and an electric potential of the line antenna 20 selected by the multiplexer 30.

In the above structure, when an electric pen emitting an electromagnetic wave approaches a certain location inside a closed loop of the loop antenna 10, that is, in a virtually set electric pen sensing area, an induction voltage is generated by an electromagnetic induction effect in all line antennas 20. In this state, the generated induction voltages show different amplitudes and phases in the respective line antennas with respect to an electric potential of the loop antenna 10. Patent Document 1 discloses a tablet for measuring a location of an electric pen by using the phenomenon.

Figure 2:
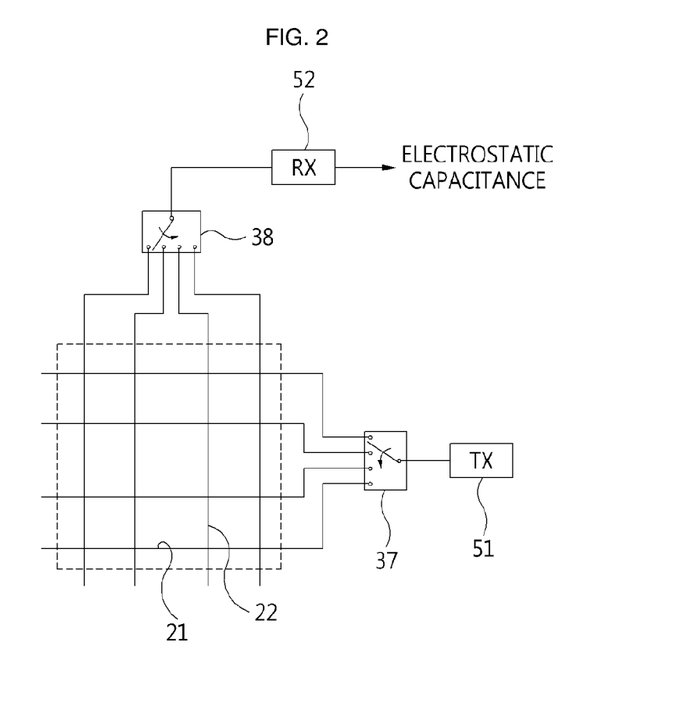
FIG. 2 illustrates a finger touch sensing circuit according to a related art.

Meanwhile, FIG. 2 illustrates a technology as a method of implementing a touch panel for sensing a touch of a human finger and a location of a touch. First, a plurality of line antennas arranged in the form of a lattice of an X-axis and a Y-axis is formed. In this state, an X-axis line antenna 21 and a Y-axis line antenna 22 may be insulated from each other or arranged on different surfaces of a substrate to prevent electric connection therebetween.

An X-axis analog switch 37 is arranged at one end of the X-axis line antennas 21 to be selectively connected to a TX circuit 51. The other end of the X-axis line antennas 21 is open. In addition, one end of the Y-axis line antennas 22 is connected to an RX circuit 52 via a Y-axis analog switch 38. The other side end of the Y-axis line antennas 22 is open.

In the above structure, the TX circuit 51 connects a drive signal having a certain voltage (or current) and a waveform to any one of the X-axis line antennas 21. In this state, the Y-axis analog switch 38 selects the Y-axis line antennas 22 one by one and measures a signal (a voltage or current by the drive signal) sensed through the RX circuit 52. Next, the drive signal is connected to another X-axis line antenna 21, and in this state, the Y-axis line antennas 22 are selected one by one. Then, a scan operation for sensing a signal of each selected one of the Y-axis line antennas 22 through the RX circuit 52 is performed. By using the signal sensed through the scan operation, the X-axis line antenna 21 and the Y-axis line antenna 22 passing a location where a finger contacts or approaches may be found out. Thus, a coordinate of a location where a finger contacts may be obtained by using the X-axis line antenna 21 and the Y-axis line antenna 22 found as above.

Meanwhile, the above tablet apparatus or touch panel may be arranged on a front surface of a display device. In this case, an antenna pattern formed in the sensing area may be designed to be as transparent as possible.

In addition, to keep with various user demands, an apparatus capable of simultaneously performing a precise manipulation input using an electric pen and a touch input by a finger with respect to a display device is demanded.

In addition, there is a demand for minimizing the width of an edge portion where circuit devices for driving an antenna pattern are arranged, as a portion surrounding the sensing area where the antenna pattern is arranged increases rapidly.

DETAILED DESCRIPTION OF THE INVENTIVE CONCEPT

Technical Problem

The present inventive concept provides a tablet capable of selectively sensing a manipulation of an electric pen and a touch of a finger by using the same antenna pattern.

In addition, the present inventive concept provides a tablet in which the shape of an antenna formed at an edge portion of a sensing area is improved and an arrangement structure of circuit devices to drive the antenna pattern is adjusted, whereby the width of a bezel area that is an outer edge portion of the sensing area is minimized so that the size of a display device may be relatively maximized without increasing the size of a tablet apparatus.

Technical Solution

According to an aspect of the present inventive concept, there is provided a tablet capable of performing location sensing in an electromagnetic induction method and location sending in an electrostatic capacitance method, the tablet including a loop antenna surrounding at least a part of a sensing area where an electromagnetic wave radiated by an electric pen is sensible, first line antennas having a plurality of first conductive patterns arranged in the sensing area, second line antennas having a plurality of second conductive patterns crossing the plurality of first conductive patterns in the sensing area, and a control circuit comprising switch devices controlling one end and the other end of each of the plurality of first conductive patterns and switch devices controlling one end and the other end of each of the plurality of second conductive patterns, and controlling connections of opposite ends of each of the plurality of first conductive patterns and the plurality of second conductive patterns by controlling the switch devices, whereby location sensing is performed by an electromagnetic induction method or an electrostatic capacitance method.

When location sensing is performed in an electrostatic capacitance method, the control circuit may control the switch devices connected to one end and the other end of each of the plurality of first conductive patterns so that the other end of each of the plurality of first conductive patterns is opened or feedback connected to the one end, and control the switch devices connected to one end and the other end of each of the plurality of second conductive patterns so that the other end of each of the plurality of second conductive patterns is opened or feedback connected to the one end.

The tablet may further include a transmission circuit transmitting a drive signal of a certain waveform and a receiving circuit receiving a sensing signal transferred by the drive signal of the transmission circuit, wherein, when location sensing is performed in an electrostatic capacitance method, the control circuit controls the switch devices connected to one end and the other end of each of the plurality of first conductive patterns so that the drive signal of the transmission circuit is supplied to one end of at least one of the plurality of first conductive patterns, and controls the switch devices connected to one end and the other end of each of the plurality of second conductive patterns so that the receiving circuit receives a sensing signal transferred to the second conductive patterns by the drive signal of the transmission circuit.

When location sensing is performed in an electromagnetic induction method, the control circuit may control the switch devices connected to one end and the other end of each of the plurality of first conductive patterns so that the other end of each of the plurality of first conductive patterns is connected to the loop antenna, and control the switch devices connected to one end and the other end of each of the plurality of second conductive patterns so that the other end of each of the plurality of second conductive patterns is connected to the loop antenna.

The tablet may further include a differential amplifier outputting an electric potential difference between the loop antenna and an induction signal electromagnetically induced by the electric pen in the first line antennas and the second line antennas, wherein, when location sensing is performed in an electromagnetic induction method, the control circuit controls the switch devices connected to one end and the other end of each of the plurality of first conductive patterns and the plurality of second conductive patterns so that an induction signal electromagnetically induced by the electric pen in the first line antennas and the second line antennas is supplied to the differential amplifier.

When location sensing is performed in an electromagnetic induction method, the tablet may further include a selector connecting the loop antenna to the ground or a common electric potential or opening a closed loop of the loop antenna.

A substrate where the plurality of first conductive patterns and the plurality of second conductive patterns are formed and the control circuit including the switch devices may be formed on different substrates.

The plurality of first conductive patterns and the plurality of second conductive patterns may be formed on one surface of one substrate in an insulation state, respectively formed on one surface and the other surface of one substrate, or formed on different substrates.

The loop antenna may be formed on any one of first substrate and second substrate or on a separate third substrate.

A power coil radiating an electromagnetic force with respect to the electric pen may be formed on any one of the first to third substrates or on a separate fourth substrate.

The power coil may include a plurality of coil patterns arranged by dividing a certain area in a horizontal direction or vertical direction, or in horizontal and vertical directions.

Advantageous Effects

According to the exemplary embodiments of the present inventive concept, a tablet capable of selectively sensing a manipulation of an electric pen and a touch of a finger by using the same antenna pattern may be implemented.

In addition, since a plurality of functions can be performed with one antenna pattern, the antenna pattern does not need to be formed in multiple layers and thus transparency of the antenna pattern may be improved.

In addition, since the shape of the antenna pattern formed at the edge portion of the sensing area is improved and the arrangement structure of circuit devices to drive the antenna pattern is adjusted, the width of a bezel area that is an outer edge portion of the sensing area is minimized so that the size of a display may be maximized within a limited apparatus size without increasing the size of a tablet apparatus.

BEST MODE

In the following description, a tablet capable of performing location sensing in an electromagnetic induction method and location sensing in an electrostatic capacitance method using the same antenna pattern structure, according to an exemplary embodiment, is described in detail with reference to the accompanying drawings.

First, a structure of a tablet capable of simultaneously sensing a manipulation of an electric pen mounted with a resonance circuit and a touch of a human finger, which is a fundamental principle of the present inventive concept, is described.

Figure 3:
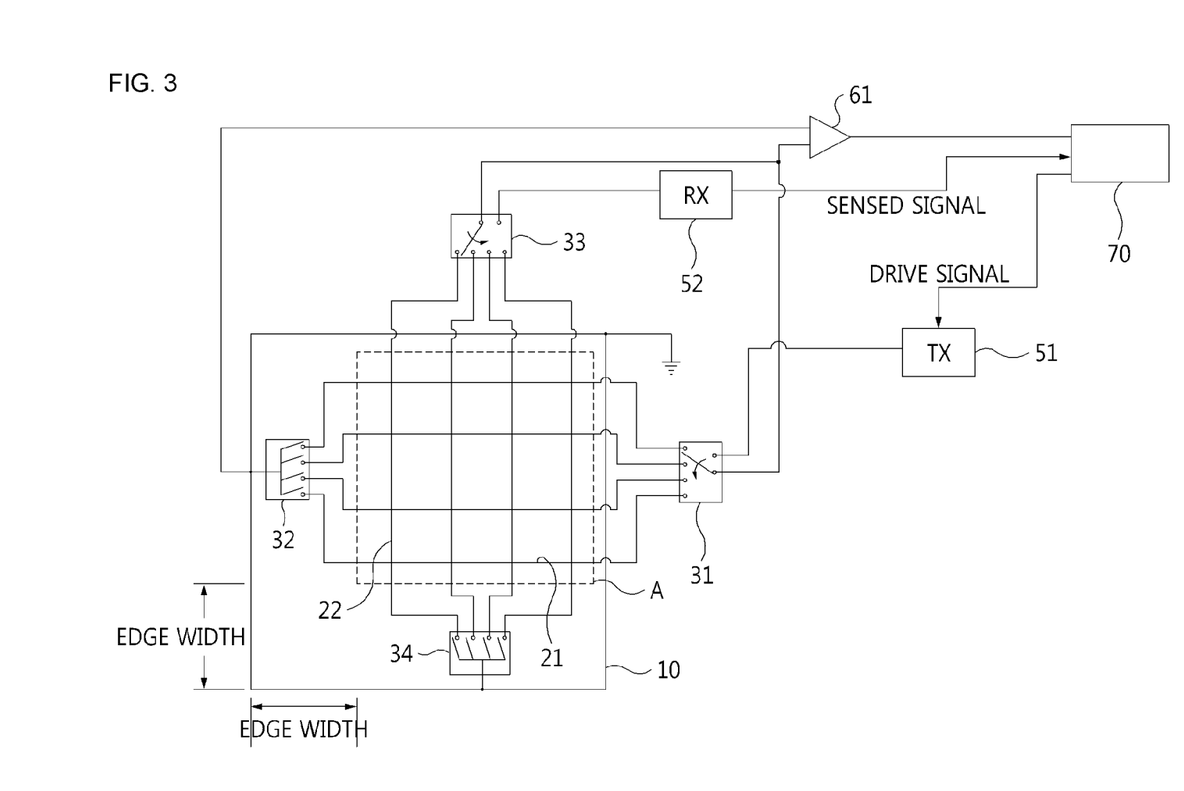
FIG. 3 illustrates a structure of a tablet capable of sensing an electric pen and a finger using the same antenna pattern according to an exemplary embodiment.

FIG. 3 schematically illustrates a structure principle of a tablet according to an exemplary embodiment which is capable of measuring locations of both an electric pen and a finger by using a line antenna pattern crossing each other in a sensing area. In the present exemplary embodiment, a principle of sensing a position of an electric pen uses the principle illustrated in FIG. 1 and a principle of sensing a position of a finger touch uses the principle illustrated in FIG. 2.

Referring to FIG. 3, the loop antenna 10 is configured to surround a sensing area A in the form of a closed loop. In this state, the loop antenna 10 may be a common electric potential or a ground electric potential. The X-axis line antenna 21 or a first line antenna, and the Y-axis line antenna 22 or a second line antenna, are arranged in a lattice shape inside the loop antenna 10, that is, a portion including the sensing area A.

One end of the X-axis line antenna 21 is connected to one side of a first analog switch 31. The first analog switch 31, under the control of the control circuit 70, may select one end of the X-axis antenna 21 for each time or simultaneously all of one ends of the X-axis antenna 21 and connect the selected one end or all of one ends to the other side of the first analog switch 31. The other side of the first analog switch 31 may be connected to the TX circuit 51 for outputting a drive signal to sense electrostatic capacitance by a finger. The TX circuit 51 is arranged between the other side of the first analog switch 31 and the control circuit 70 and may be configured to be alternatively operated with a differential amplifier 61.

FIG. 3 illustrates that the first analog switch 31 has four one sides and two other sides and the other side may select a connection to the TX circuit 51 and to the differential amplifier 61. However, the structure may be implemented in various methods, for example, by adding a separate switch.

The other end of the X-axis line antenna 21 may be connected to each input side of a second analog switch 32. The second analog switch 32 may be operated to allow all input sides thereof to be simultaneously connected to or disconnected from an output side thereof. Furthermore, an operation of selecting one or more input side and connecting the selected one or more input sides to an output side thereof may be implemented.

The differential amplifier 61 is configured to sense a location of an electric pen using an electromagnetic induction phenomenon in the sensing area, and includes at least two input sides. One input side of the differential amplifier 61 is connected to the other side of the first analog switch 31 and an output side of a third analog switch 33, whereas the other one input side may be connected to the loop antenna 10. The differential amplifier 61 performs a function of outputting a electric potential difference between two input sides, that is, one end of any one X-axis line antenna 21 selected by the first analog switch 31 or one end of any one Y-axis line antenna 22 selected by the third analog switch 33, and the loop antenna 10. An output side of the differential amplifier 61 is connected to the control circuit 70. As the respective line antennas are selected at a timing when the first analog switch 31 and the third analog switch 33 do not overlap with each other, any one X-axis line antenna 21 or any one Y-axis line antenna 22 only may be connected to the input side of the differential amplifier 61

The TX circuit 51, under the control of the control circuit 70, is implemented to output a drive signal having certain voltage/current and waveform. The TX circuit 51 is implemented to be alternatively operated with the differential amplifier 61.

The RX circuit 52, under the control of the control circuit 70, connects an electric potential of any one Y-axis line antenna 22 selected by the third analog switch 33 to the control circuit 70. Accordingly, when a finger approaches a certain intersection point of the X-axis line antenna 21 and the Y-axis line antenna 22, a drive signal applied to the X-axis line antenna 21 crossing the intersection point is transferred to the Y-axis line antenna 22 crossing the intersection point by the electrostatic capacitance of the finger approaching the intersection point, and the drive signal transferred by the third analog switch 33 is presented as a sensing signal to the control circuit 70 through the RX circuit 52.

The control circuit 70 may check a sensing signal by sequentially scanning all Y-axis line antennas 22 with respect to each one of all X-axis line antennas 21, thereby identifying a finger touch point.

In the tablet according to the present exemplary embodiment operating in an electric pen sensing mode, one end of the X-axis line antenna 21 and one end of the Y-axis line antenna 22 are connected to the loop antenna 10 by turning on the second analog switch 32 and a fourth analog switch 34. Then, the first analog switch 31 and the third analog switch 33 sequentially selects each one line antenna, and in addition, the differential amplifier 61 is operated to sense an induction voltage generated by the approach of an electric pen, thereby sensing a location of an electric pen.

When the tablet operates in a touch sensing mode, one end of the X-axis line antenna 21 and one end of the Y-axis line antenna 22 are in an off state by turning off both of the second analog switch 32 and the fourth analog switch 34. The differential amplifier 61 is disconnected from each of the first analog switch 31 and the third analog switch 33. The first analog switch 31 selects any one X-axis line antenna 21 and the drive signal applied via the TX circuit 51 is applied to the selected X-axis line antenna 21. In this state, the third analog switch 33 selects one Y-axis line antenna 22, and the control circuit 70 checks a sensing signal at each selected Y-axis line antenna 22. In the state in which one of the X-axis line antennas 21 is selected, when the operation of sequentially selecting all Y-axis line antennas 22 is completed, another X-axis line antenna 21 is selected and the operation of checking all Y-axis line antennas 22 one by one is repeated. When all checking operation is completed, the amplitude of each sensing signal is checked and thus a touch position may be determined.

In the tablet operating by the antenna structure illustrated in FIG. 3, since only the X-axis line antenna 21 and the Y-axis line antenna 22 are formed in the sensing area, the number of antennas arranged in the sensing area is relatively small.

In addition, since a line antennas pattern, that is, a pattern for forming at least a portion corresponding to the sensing area A of FIG. 3, may be configured by a method of printing a transparent conductive material on a transparent substrate, manufacturing a substrate for an antenna may be simple and inexpensive.

Alternatively, the sensing area A in which the X-axis line antenna 21 and the Y-axis line antenna 22 cross each other in an insulation state may be configured by only printing the X-axis line antenna 21 on a transparent substrate 21B in a single layer and the Y-axis line antenna 22 on a transparent substrate 22B in a single layer, and overlapping the transparent substrates 21B and 22B. Accordingly, since the sensing area A is implemented by only two transparent substrates where transparent electrodes are printed, transparency of a sensing area may be improved.

In the structure of FIG. 3, since each analog switch is arranged at an outer edge portion of the sensing area A and a plurality of antenna patterns are closely arranged to allow each antenna pattern to be connected to the analog switch, the width of the edge portion is increased.

A recent tablet may be often arranged by being overlapped on a front surface of a display device. In this state, the sensing area corresponds to a display area of the display device and an edge width of the sensing area corresponds to a bezel area of the display device. In this case, since the width of the bezel area of the display device cannot be increased according to the size of the edge width of a tablet, the width of the outer edge of the sensing area A in the tablet needs to be minimized.

Accordingly, in the following description, a method of minimizing the width of the outer edge of the sensing area A is described with reference to FIG. 4.

In other words, the size of the sensing area A may be maximized and the size (width) of the bezel area may be minimized by improving the shape of the loop antenna 10, the shape of each of the X-axis and Y-axis line antennas 21 and 22, and the arrangement position of each circuit device including the first to fourth analog switches 31 to 34.

Figure 4:
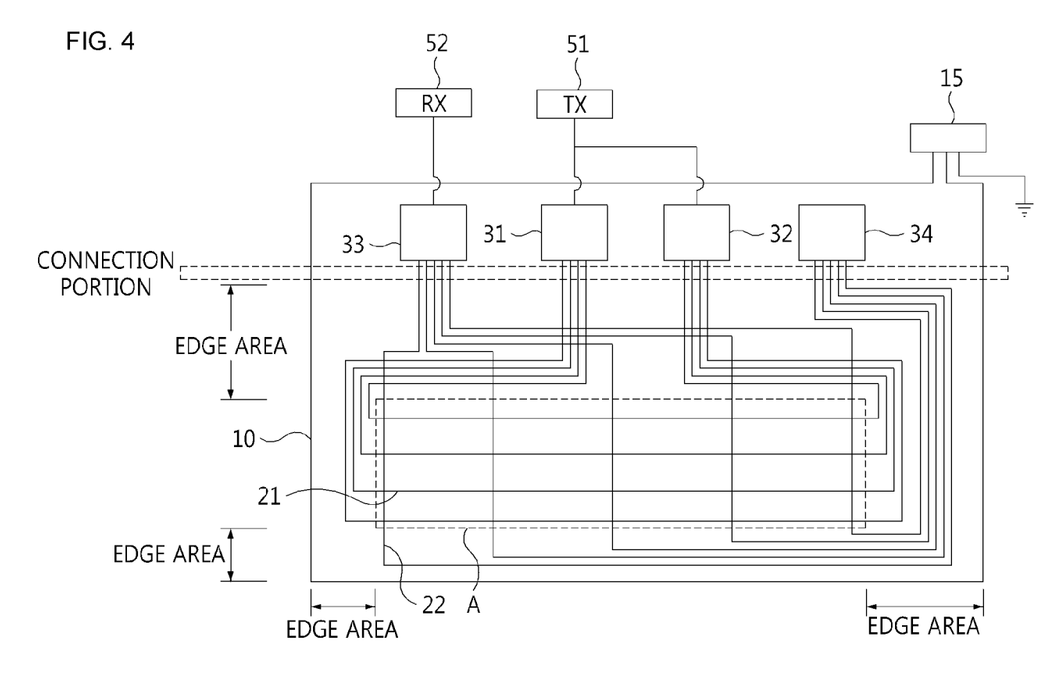
FIG. 4 illustrates an antenna pattern according to another exemplary embodiment, in which a TX circuit is configured to simultaneously apply a drive signal to opposite ends of a line antenna.

FIG. 4 illustrates an antenna pattern according to another exemplary embodiment, showing a structure in which a TX circuit simultaneously applies a drive signal to opposite ends of a line antenna. In FIG. 4, the first to fourth analog switches 31 to 34 are closely and parallelly arranged outside any one side of the sensing area A having a substantially rectangular shape, whereas the X-axis line antenna 21 and the Y-axis line antenna 22 are patterned to extend along the edge portion to be connected to each of the analog switches.

Although the first to fourth analog switches 31 to 34 are arranged parallel to one another as illustrated in FIG. 4, they may be arranged at different positions. However, in the present exemplary embodiment, a connector is formed at one side of the sensing area A and the analog switches are closely and parallelly arranged so that all line antennas (a loop antenna and a part of a power coil may be further be included) may be drawn through the connector.

Figure 5:
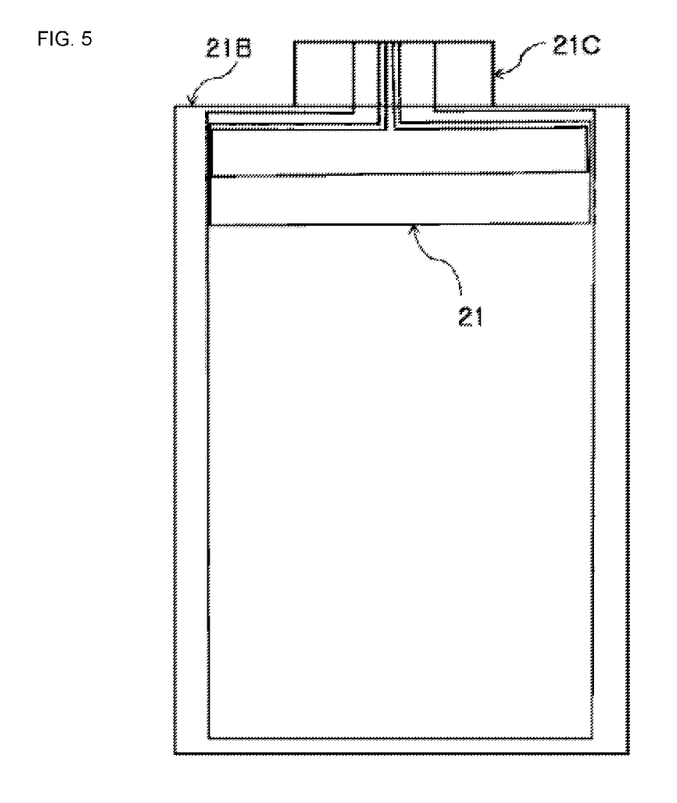
FIGS. 5 to 9 illustrate a transparent substrate where an X-axis line antenna is formed and/or a transparent substrate where a Y-axis line antenna is formed, and a pattern shape of the X-axis line antenna and a pattern shape of the Y-axis line antenna, according to various exemplary embodiments.

As the first to fourth analog switches 31 to 34 are closely and parallelly arranged and the X-axis and Y-axis line antennas 21 and 22 are patterned to be concentrated at one side toward the first and fourth analog switches 31 to 34, only an antenna pattern may be formed on a transparent substrate and various circuit devices may be separately configured on another substrate, for example, a PCB. In this state, a connector portion indicated by a reference character "C" for electric connection of the respective patterns may be configured on the transparent substrate, and an electrode corresponding to the connector portion may be formed on the PCB (see FIG. 5 and its subsequent drawings; FIG. 5 and its subsequent drawings show a pattern shape of the transparent substrate).

In other words, the transparent substrate where the antenna pattern is formed and the PCB where various circuit devices are arranged may be divided by the connector portion that is indicated by a dotted line in FIG. 4.

A method of printing a conductive material, for example, ITO, may be applied to the transparent substrate to form a pattern of the conductive material that forms the line antennas 21 and 22 and the loop antenna 10. When a printing method is employed, only one layer may be formed on a surface of one substrate. Accordingly, the X-axis line antenna 21 and the Y-axis line antenna 22 requiring insulation from each other may not be simultaneously printed on the same surface. To address the issue, the X-axis line antenna 21 and the Y-axis line antenna 22 may be separately printed on both side surfaces of one transparent substrate, or a first transparent substrate 21B where only a pattern of the X-axis line antenna 21 is printed and the second transparent substrate 22B where only a pattern of the Y-axis line antenna 22 is printed may be overlapped with each other (see FIG. 9).

In the present exemplary embodiment, the loop antenna 10 may be configured to allow a part of a closed loop to be selectively open or closed. To this end, a selector 15 having at least two inputs is prepared and one side of the closed loop of the loop antenna 10 is cut and opposite ends of the closed loop are connected as inputs of the selector 15. The selector 15, under the control of the control circuit 70, connects the opposite ends of the loop antenna 10 to each other (closed loop completed) or maintains a cut state (closed loop opened).

The loop antenna 10 may be maintained by a common electric potential or connected to the ground. To this end, one side of the loop antenna 10 may be connected to the common electric potential or the ground. In the present exemplary embodiment, the selector 15 is implemented to have three inputs and a third input is connected to the ground or the common electric potential. The three inputs may be configured to be all connected (the loop antenna 10 forms a closed loop and is simultaneously connected to the ground), or to be all opened (the closed loop of the loop antenna 10 is open and simultaneously the loop antenna 10 and the ground are disconnected from each other), under the control of the control circuit 70.

The selector 15 configured as above is operated to connect all input sides in the electric pen sensing mode and to open all input sides in the touch sensing mode.

The selector 15 is added because, in the state in which the loop antenna 10 forming a closed loop in the electric pen sensing mode continuously maintains the closed loop in the touch sensing mode, when a human finger touches the sensing area, electrostatic capacitance may not be sufficiently well sensed by the X-axis and Y-axis line antennas 21 and 22 due to the structure of the closed loop.

The pattern of the loop antenna 10 may be formed by being printed together with any one of the transparent substrate 21B where the X-axis line antenna 21 is printed and the transparent substrate 22B where the Y-axis line antenna 22 is printed, or may be formed on a separate transparent substrate 10B. In addition, when the loop antenna 10 is arranged outside the sensing area A, it may be formed on an opaque substrate.

In the tablet of FIG. 4, it is characteristic that, unlike the structure of FIG. 3, the TX circuit 51 is configured to be simultaneously connected to the opposite ends of the X-axis line antennas 21.

In other words, when the first analog switch 31 selects one end of any one X-axis line antenna 21, the second analog switch 32 is controlled to select the other end of the line antenna selected by the first analog switch 31. In the state in which the same line antenna is selected, when the TX circuit 51 applies a drive signal, the drive signal is simultaneously applied to the first analog switch 31 and the second analog switch 32.

The above structure is employed for the following reason.

When one end of a line antenna is open and a drive signal is applied from the opposite end, as illustrated in FIG. 3, the amplitude of the drive signal appears to be different at each portion of the line antenna in the sensing area. In other words, the conductive material forming the pattern of a line antenna may be, for example, ITO, such a material has a large intrinsic resistance and thus, when a conductive pattern is applied to a sensing area having a relatively large size, the drive signal applied from one end may appear to be attenuated by a small size by electric resistance of the conductive material at the opposite end. As such, when the drive signal is attenuated, sensing a finger touch may be difficult.

Accordingly, when the drive signal is simultaneously applied from the opposite ends of a line antenna, even in a case of a relatively large sensing area, that is, the antenna is long, a sufficiently large drive signal may appear in the entire sensing area.

FIGS. 5 to 9 illustrates the transparent substrate where the X-axis line antenna 21 is formed and/or the transparent substrate where the Y-axis line antenna 22 is formed, and a pattern shape of the X-axis line antenna 21 and a pattern shape of the Y-axis line antenna 22, according to various exemplary embodiments.

FIG. 5 illustrates a transparent substrate where a pattern of the X-axis line antenna 21 extending in the X-axis direction is formed. On end and the other end of the X-axis line antenna 21 are configured to proceed along the left and right sides of the sensing area A.

The pattern of the X-axis line antenna 21 is formed to proceed outward through a connector portion 21C provided on one side of the transparent substrate 21B, for example, an upper side. The connector portion 21C is provided to connect the antenna pattern to a contact point corresponding to other circuit board, that is, a separated circuit board where an analog switch and/or other circuit parts are mounted.

Figure 6:
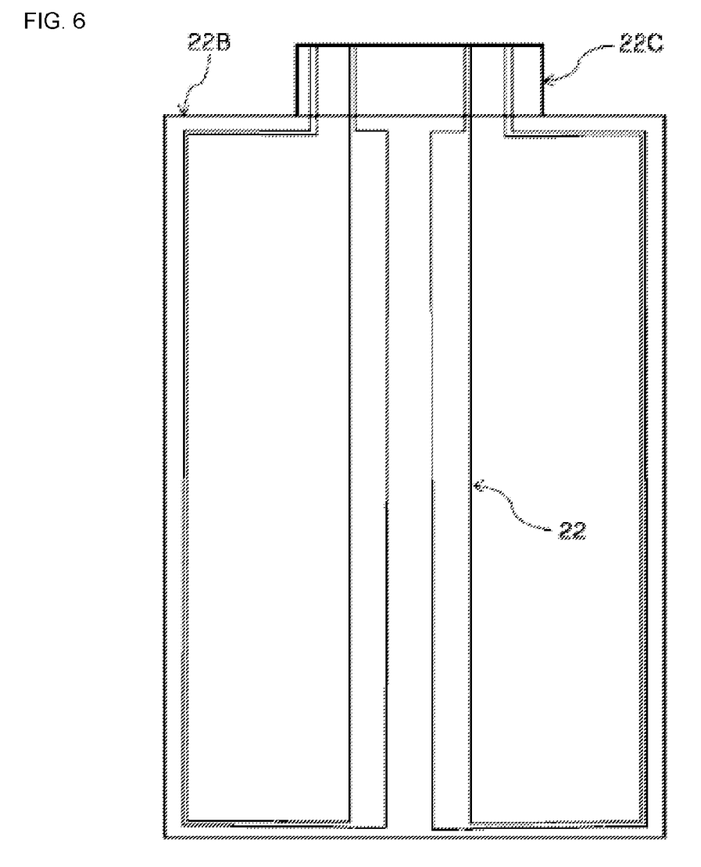

FIG. 6 illustrates a pattern of the Y-axis line antenna 22 extending in a vertical direction, in which line antennas are vertically and parallelly arranged in an inner portion corresponding to the sensing area A, and proceed as close to each other as possible in an edge portion and are drawn outward through a connection portion 22C in an upper side.

In the pattern shape of FIG. 6, the Y-axis line antennas 22 in the left half proceed along the left edge of the transparent substrate 22B toward the connector portion 22C, whereas the Y-axis line antennas 22 in the right half proceed along the right edge of the transparent substrate 22B toward the connector portion 22C.

As the pattern of the Y-axis line antenna 22 is designed to proceed by being partially divided into the left and right sides, the width of the outer edge portion of the transparent substrate may be further minimized.

Figure 7:
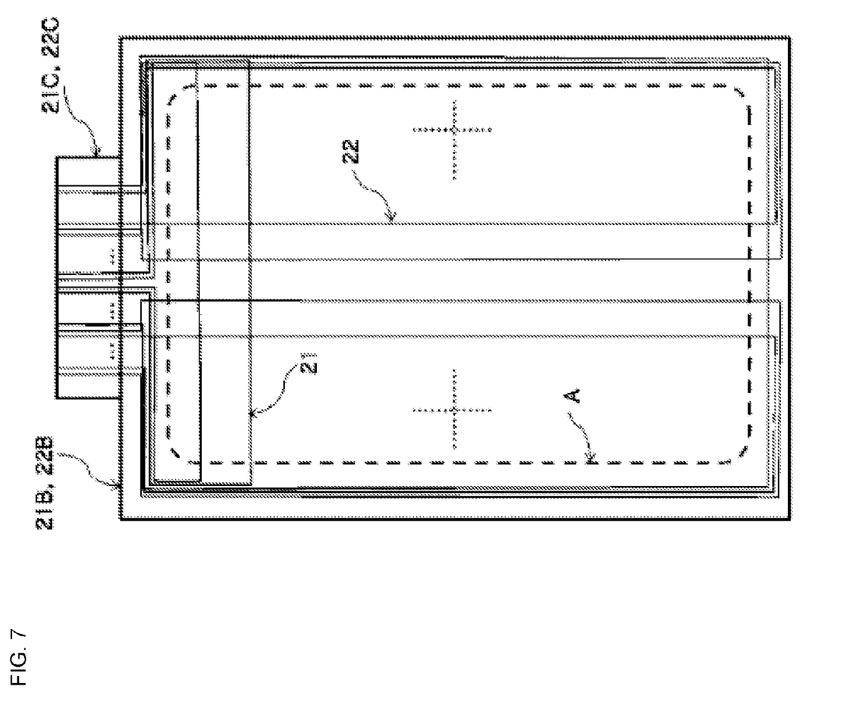

FIG. 7 illustrates the shape of the line antennas when the transparent substrate 21B where the X-axis line antenna 21 is printed and the transparent substrate 22B where the Y-axis line antenna 22 is printed are overlapped with each other. Although the pattern of the X-axis line antenna 21 and the pattern of the Y-axis line antenna 22 appear to cross each other or be overlapped with each other, the line antennas are actually insulated because the transparent substrates 21B and 22B are overlapped in the state in which the patterns of the line antennas are printed on the respective transparent substrates 21B and 22B.

Figure 8A:
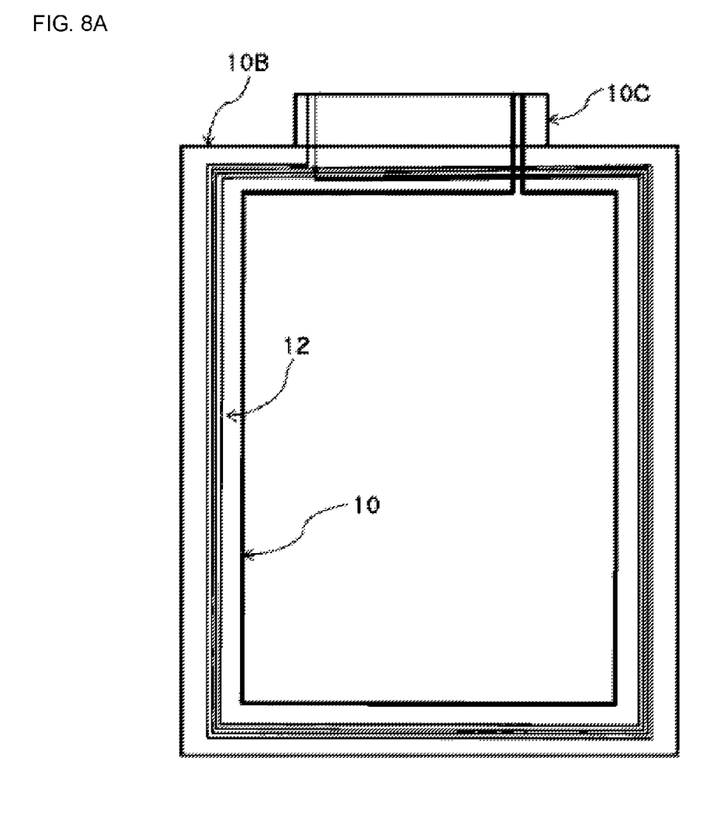
Figure 8B:
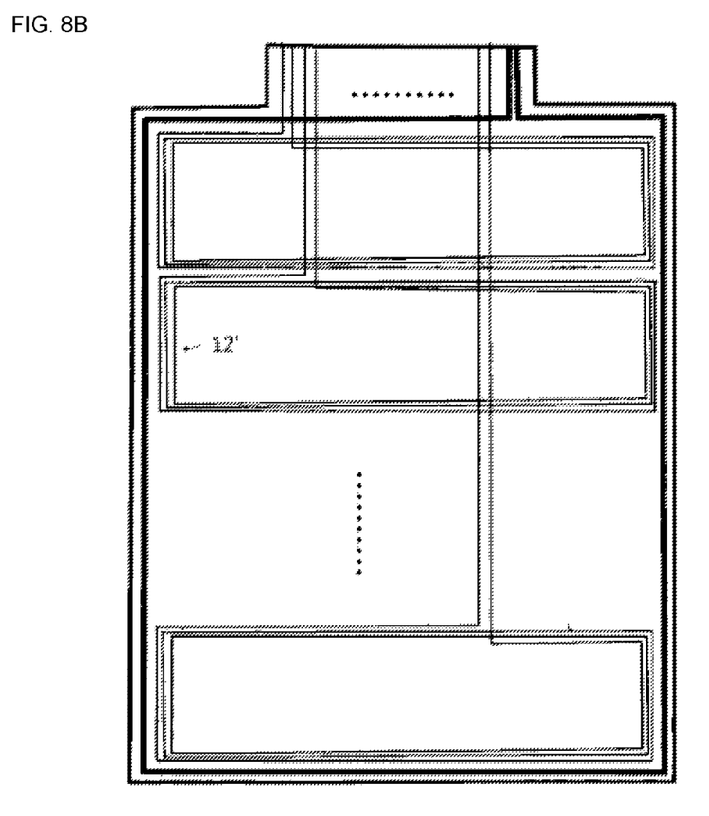

FIGS. 8A and 8B illustrate other substrates where the loop antenna 10 is arranged. In an example, the loop antenna 10 may be formed simultaneously with a pattern of a power coil 12. The power coil 12 is configured to radiate an electromagnetic force with respect to an electric pen having a resonance circuit. An operation of the power coil 12 may be understood with reference to the above-described Patent Document 1.

In the present exemplary embodiment, the power coil 12 is provided to provide an electromagnetic force with respect to a powerless electric pen having a resonance circuit. However, if an electric pen may include a built-in battery and radiate an electromagnetic wave through the resonance circuit by receiving energy from the built-in battery, the configuration of a power coil may be omitted.

In addition, in FIGS. 8A and 8B, it can be seen that the loop antenna 10 does not form a complete closed loop in the transparent substrate 10B and proceeds outward through a connector 10C in an open state. The loop antenna 10 may complete a closed loop through the selector 15 mounted on another circuit board.

FIG. 8A illustrates an example in which the loop antenna 10 and a pattern of the single power coil 12 are simultaneously arranged on the transparent substrate 10B. However, when the tablet is relatively large, if energy is supplied to the electric pin with only a signal pattern of the power coil 12, energy supply efficiency is degraded causing a malfunction.

FIG. 8B illustrates an example in which the loop antenna 10 and a pattern of a plurality of power coils 12' are simultaneously arranged on the transparent substrate 10B. In an operation of the power coils 12 with respect to the electric pen, only the power coil corresponding to the position of the electric pen may be operated according to the position of the electric pen. The power coils 12' may be arranged by dividing an area in a horizontal direction as illustrated in FIG. 8B, or in a vertical direction. In addition, the power coils 12' may be arranged by dividing the area in both of the horizontal and vertical directions.

Figure 9:
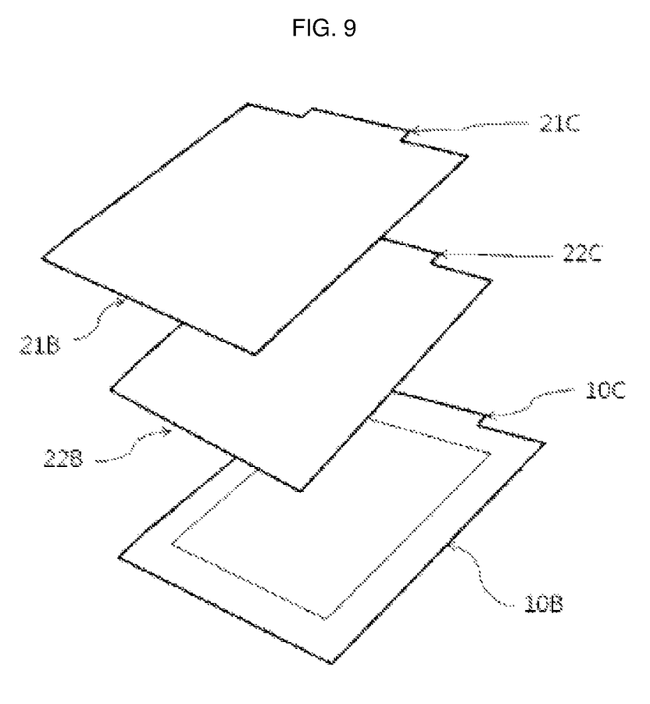

FIG. 9 illustrates that, after separately forming the transparent substrate 21B where the pattern of the X-axis line antenna 21 is formed as illustrated in FIG. 5, the transparent substrate 22B where the pattern of the Y-axis line antenna 22 is formed as illustrated in FIG. 6, and the transparent substrate 10B where the pattern of the loop antenna 10 is formed as illustrated in FIGS. 8A and 8B, the substrates are overlapped with one another, thereby implementing the sensing area A.

Figure 10:
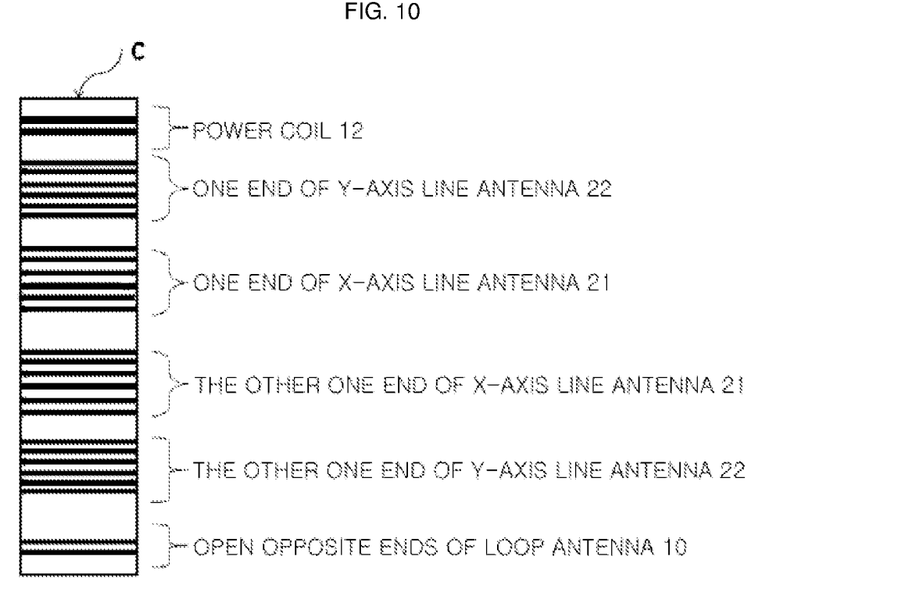
FIGS. 10 to 12 illustrate a connection of circuit devices to a connector when a tablet according to an exemplary embodiment is operated in an electric pen sensing mode and a touch sensing mode.
Figure 11:
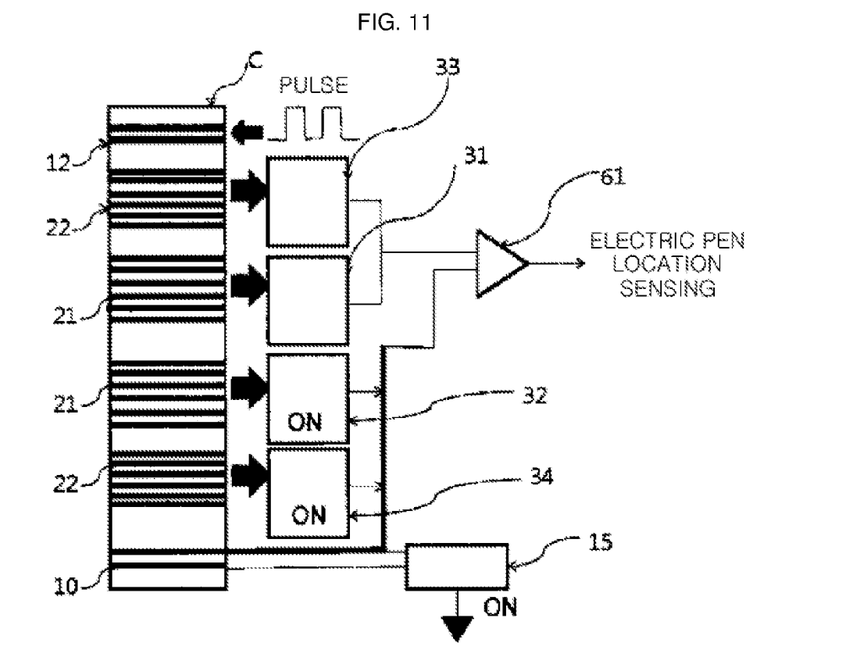
Figure 12:
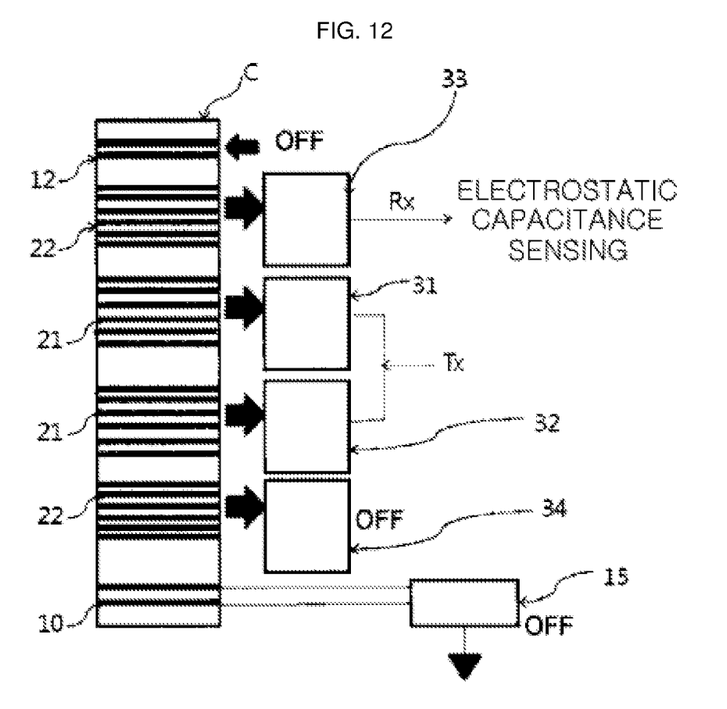

FIGS. 10 to 12 illustrate control of the line antennas 21 and 22 and the loop antenna 10 when the tablet according to an exemplary embodiment is operated in an electric pen sensing mode and a touch sensing mode, in detail, how circuit devices are connected to the connector portions 21C, 22C, and 10C.

In FIG. 10, it is assumed that, in the state in which the transparent substrates 21B and 22B where the X-axis and Y-axis line antennas 21 and 22 are printed and the transparent substrate 10B where the loop antenna 10 and the power coil 12 are formed are overlapped with each other, a portion where the connector portions 21C and 22C and the connector portion 10C of the transparent substrate 10B are overlapped with each other is considered to be a connector portion C.

FIG. 11 illustrates a connection relation of the respective antenna patterns to obtain an X-Y coordinate of an electric pen when the tablet is operated in the electric pen sensing mode.

When the tablet is operated in an electric pen sensing mode, the other ends of the X-axis line antenna 21 and the Y-axis line antenna 22 are all connected to the loop antenna 10. To this end, all input sides of the second analog switch 32 and the fourth analog switch 34 are connected to the output sides. In an electric pen sensing mode according to another exemplary embodiment, the second analog switch 32 and/or the fourth analog switch 34 may be configured to connect only one X-axis line antenna 21 selected by the first analog switch 31 and only one Y-axis line antenna 22 selected by the third analog switch 33 to the loop antenna 10. As such, when the first analog switch 31 selects any one X-axis line antenna 21 and the third analog switch 33 selects any one Y-axis line antenna 22, at least the selected line antennas is in a state of being connected to the loop antenna 10.

The loop antenna 10 is connected to the ground by the selector 15.

When the power coil 12 is configured, a voltage pulse having a particular frequency may be applied to the power coil 12 to supply an electromagnetic wave having a certain frequency to the electric pen.

The output sides of the first analog switch 31 and the third analog switch 33 are connected to the differential amplifier 61. The differential amplifier 61 is connected to the control circuit 70 and used to sense a location of the electric pen.

FIG. 12 illustrates a connection relation of the respective antenna patterns when the tablet is operated in the touch sensing mode.

When the tablet is operated in the touch sensing mode, a drive signal is applied to the opposite ends of the X-axis line antenna 21 by using the TX circuit 51. One end of the Y-axis line antenna 22 is off from the loop antenna 10 by turning the fourth analog switch 34 off. The third analog switch 33 is selected one by one and is connected to the RX circuit 52 so that the control circuit 70 may sense a location of a finger touch.

In the touch sensing mode, the power coil 12 is not operated. In addition, the loop antenna 10 may be open by turning the selector 15 off.

Figure 13:
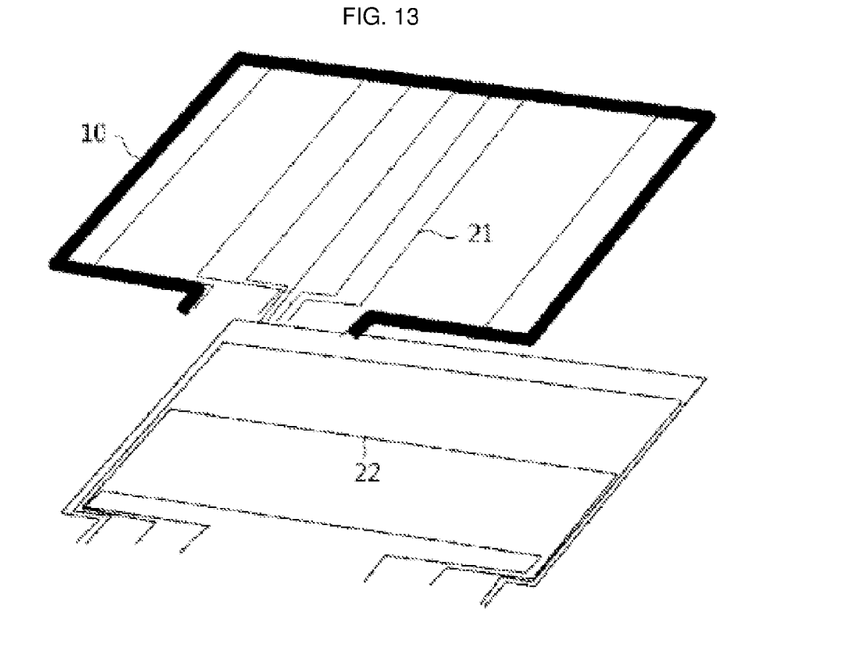
FIG. 13 illustrates the shape of line antennas in a case in which an antenna pattern for sensing an electric pen of FIG. 1 and a double routing antenna pattern of FIG. 5 are combined.

FIG. 13 illustrates the shapes of the line antennas 21 and 22 when the antenna pattern for sensing an electric pen illustrated in FIG. 1 and the double routing antenna pattern of FIG. 5 are combined with each other.

One of the X-axis line antenna 21 and the Y-axis line antenna 22 is formed in an antenna pattern for sensing an electric pen illustrated in FIG. 1. In other words, the loop antenna 10 forms a closed loop, and the X-axis line antenna 21 has one end electrically connected to the loop antenna 10 and is formed of a plurality of line antenna patterns arranged parallel to one another and having a comb shape.

In addition, one of the X-axis line antenna 21 and the Y-axis line antenna 22 is formed in the double routing antenna pattern of FIG. 5. In other words, in the Y-axis line antenna 22, the double routing antenna pattern is formed close to a loop shape in the sensing area A and one end and the other end thereof are located at one side.

In this case, an existing antenna pattern related to the sensing of an electric pen uses the principle of FIG. 1. Accordingly, when the antenna pattern for sensing an electric pen of FIG. 1 is implemented in the X-axis line antenna 21, the second analog switch 32 for connecting the other end of the X-axis line antenna 21 does not exist in the loop antenna 10. When the antenna pattern for sensing an electric pen of FIG. 1 is implemented in the Y-axis line antenna 22, the fourth analog switch 34 for connecting the other end of the Y-axis line antenna 22 does not exist in the loop antenna 10. Accordingly, the operation of FIG. 13 in the case in which the antenna pattern for sensing an electric pen illustrated in FIG. 1 and the double routing antenna pattern of FIG. 5 are combined with each other may be sufficiently understood through the above descriptions in FIGS. 3 and 4.

When the electric pen is provided with a battery and thus no power coil is needed, the structure of FIG. 13 may be configured with two antenna layers by removing the transparent substrate 10B where the pattern of the loop antenna 10 of FIG. 9 is formed.

According to the above-described antenna structure of the tablet according to the present exemplary embodiment, the X-axis line antenna 21 and the Y-axis line antenna 22 may be respectively formed by the conductive patterns printed in a printing method. In addition, since the location of an electric pen and the position of a finger may be selectively sensed with two patterns only overlapped to be perpendicular to the sensing area A, the sensing area A may be implemented with only two sheets of transparent circuit boards. Alternatively, the pattern of the X-axis line antenna 21 and the pattern of the Y-axis line antenna 22 may be respectively formed on the opposite surfaces of one sheet of a transparent circuit board. Accordingly, since the number of circuit boards is small and the number of antennas crossing each other or overlapped with each other is small, transparency of the sensing area A may be improved.

In addition, according to the above-described line antenna structure, the pattern of the line antenna is bent at the outer edge portion of the sensing area A to proceed toward the analog switches arranged at certain positions, thereby reducing the width of the edge area as much as possible. Furthermore, since the circuit devices may be arranged at certain positions, a degree of freedom in a circuit design is increased.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

The invention claimed is:

1. A tablet performing location sensing in an electromagnetic induction method and location sensing in an electrostatic capacitance method, the tablet comprising:
   a first substrate on which a first line antenna having a plurality of first conductive patterns is formed, wherein a first end of each of the plurality of first conductive patterns and a second end of each of the plurality of first conductive patterns are positioned at a first side of the first substrate;
   a second substrate on which a second line antenna having a plurality of second conductive patterns is formed,
   wherein a third end of each of the plurality of second conductive patterns and a fourth end of each of the plurality of second conductive patterns are positioned at a first side of the second substrate, and
   wherein the second substrate is overlapped with the first substrate;
   a loop antenna formed on one of the first substrate and the second substrate, wherein the loop antenna surrounding at least a part of a sensing area sensing an electromagnetic wave radiated by an electric pen;
   a PCB having a control circuit connected to the first side of the first substrate and the first side of the second substrate,
   wherein the control circuit comprises:
   a first switch device coupled to the first end of each of the plurality of first conductive patterns of which a part is disposed in the sensing area and extended in a first direction;
   a second switch device coupled to the second end of each of the plurality of first conductive patterns;
   a third switch device coupled to the third end of each of the plurality of second conductive patterns of which a part is disposed in the sensing area and extended in a second direction substantially perpendicular to the first direction; and
   a fourth switch device coupled to a fourth end of each of the plurality of second conductive patterns,
   wherein the control circuit controls the first switch device, the second switch device, the third switch device and the fourth switch device so that the location sensing is performed by an electromagnetic induction method or an electrostatic capacitance method.

2. The tablet of claim 1, further comprising:
a transmission circuit transmitting a drive signal of a certain waveform; and
a receiving circuit receiving a sensing signal transferred by the drive signal of the transmission circuit,
wherein, if the location sensing is performed in an electrostatic capacitance method, the control circuit controls the first switch device so that the drive signal of the transmission circuit is supplied to the first end of at least one of the plurality of first conductive patterns, and controls the second switch device so that the receiving circuit receives a sensing signal transferred to the second conductive patterns by the drive signal of the transmission circuit.

3. The tablet of claim 1, further comprising:
a differential amplifier outputting an electric potential between the loop antenna and an induction signal electromagnetically induced by the electric pen in the first line antenna and the second line antenna,
wherein, if the location sensing is performed in an electromagnetic induction method, the control circuit controls the first switch device, the second switch device, the third switch device and the fourth switch device so that an induction signal electromagnetically induced by the electric pen in the first line antenna and the second line antenna is supplied to the differential amplifier.

4. The tablet of claim 1, further comprising:
a selector configured to, if the location sensing is performed, connect the loop antenna to the ground or a common electric potential so that the location sensing is performed by an electromagnetic induction method or configured to open a closed loop of the loop antenna so that the location sensing is performed by an electrostatic capacitance method.

5. The tablet of claim 1, further comprising:
a power coil formed on the one of the first substrate and the second substrate on which the loop antenna is formed,
wherein the power coil radiates an electromagnetic force with respect to the electric pen.

6. The tablet of claim 5,
wherein the power coil comprises a plurality of coil patterns, and
wherein the one of the first substrate and the second substrate includes a plurality of substrate regions,
wherein each of the plurality of coil patterns is positioned within one of the plurality of substrate region so that the plurality of coil patterns is separated from each other on the one of the first substrate and the second substrate.

7. The tablet of claim 6,
wherein the plurality of substrate regions is divided along a horizontal direction, along a vertical direction or along both a horizontal direction and a vertical direction.

8. The tablet of claim 1,
wherein the first line antenna is patterned to extend along an edge area outside the sensing area so that the first end and the second end are connected to the first switch device and the second switch device, respectively, and
wherein the second line antenna is patterned to extend along the edge area outside the sensing area so that the third end and the fourth end are connected to the third switch device and the fourth switch device, respectively.

9. A tablet performing location sensing in an electromagnetic induction method and location sending in an electrostatic capacitance method, the tablet comprising:
a first substrate on which a loop antenna is formed, wherein the loop antenna surrounding at least a part of a sensing area sensing an electromagnetic wave radiated by an electric pen;
a second substrate having a first surface on which a first line antenna having a plurality of first conductive patterns is formed and a second surface on which a second line antenna having a plurality of second conductive patterns,
wherein the first surface is opposite to the second surface,
wherein a first end of each of the plurality of first conductive patterns and a second end of each of the plurality of first conductive patterns are positioned at a first side of the second substrate, and
wherein a third end of each of the plurality of second conductive patterns and a fourth end of each of the plurality of second conductive patterns are positioned at the first side of the second substrate; and
a PCB having a control circuit connected to the first substrate and the first side of the second substrate,
wherein the control circuit comprises:
a first switch device coupled to the first end of each of the plurality of first conductive patterns of which a part is disposed in the sensing area and extended in a first direction;
a second switch device coupled to the second end of each of the plurality of first conductive patterns;
a third switch device coupled to the third end of each of the plurality of second conductive patterns of which a part is disposed in the sensing area and extended in a second direction substantially perpendicular to the first direction; and
a fourth switch device coupled to a fourth end of each of the plurality of second conductive patterns,
wherein the control circuit controls the first switch device, the second switch device, the third switch device and the fourth switch device so that the location sensing is performed by an electromagnetic induction method or an electrostatic capacitance method.

* * * * *